United States Patent [19]
Gobush et al.

[11] Patent Number: 5,471,383
[45] Date of Patent: Nov. 28, 1995

[54] MONITORING SYSTEMS TO MEASURE AND DISPLAY FLIGHT CHARACTERISTICS OF MOVING SPORTS OBJECT

[75] Inventors: William Gobush, No. Dartmouth; Diane Pelletier, Fairhaven; Charles Days, So. Dartmouth, all of Mass.

[73] Assignee: Acushnet Company, Fairhaven, Mass.

[21] Appl. No.: 316,599

[22] Filed: Sep. 30, 1994

Related U.S. Application Data

[63] Continuation-in-part of Ser. No. 242,590, May 13, 1994, which is a continuation of Ser. No. 63,611, May 18, 1993, abandoned, which is a continuation of Ser. No. 823,732, Jan. 22, 1992, abandoned.

[51] Int. Cl.⁶ .................................................. G06F 151/00
[52] U.S. Cl. ........................................ 364/410; 273/185 R
[58] Field of Search ............................. 364/410; 273/25, 273/26 R, 183.1, 186.2, 55 R, 85 G, 176 L, 184 R, 185 R; 348/47, 157

[56] References Cited

U.S. PATENT DOCUMENTS

| | | | |
|---|---|---|---|
| 3,513,707 | 5/1970 | Russell et al. | 273/185 B |
| 4,136,387 | 1/1979 | Sullivan et al. | 364/410 |
| 4,158,853 | 6/1979 | Sullivan et al. | 364/410 |
| 4,695,888 | 9/1987 | Peterson | 348/221 |
| 4,695,891 | 9/1987 | Peterson | 348/368 |
| 4,713,686 | 12/1987 | Ozaki et al. | 348/157 |
| 5,101,268 | 3/1992 | Ohba | 348/43 |
| 5,111,410 | 5/1992 | Nakayama et al. | 364/551.01 |
| 5,210,603 | 5/1993 | Sabin | 348/157 |

*Primary Examiner*—Donald E. McElheny, Jr.
*Attorney, Agent, or Firm*—Pennie & Edmonds

[57] ABSTRACT

A sports object flight monitoring system including at least one shutterable camera units each of which units receive light patterns from each and every one of a plurality of contrasting areas or markers on the object in rapid successive sequence. A computer receives the signals generated by the light patterns as received by each camera unit to determine the flight characteristics of the object.

46 Claims, 9 Drawing Sheets

MONITORING SYSTEMS TO MEASURE AND DISPLAY FLIGHT CHARACTERISTICS OF MOVING SPORTS OBJECT

CROSS-REFERENCE TO RELATED APPLICATIONS

This application is a continuation-in-part of U.S. patent application Ser. No. 08/242,590, filed May 13, 1994, which is a continuation of U.S. patent application Ser. No. 08/063,611, filed May 18, 1993, abandoned, which is a continuation of U.S. patent application Ser. No. 07/823,732, filed Jan. 22, 1992, now abandoned. Each of the above identified applications, which are commonly assigned, is incorporated herein by reference.

BACKGROUND OF THE INVENTION

Ball monitoring devices for using multiple electro-sensors to determine the angle of launch, spin rate and speed of sports objects are old. See, for example, U.S. Pat. Nos. 4,063,259; 4,136,387; 4,160,942; and 4,158,853.

SUMMARY OF THE INVENTION

Broadly, the present invention comprises a portable system for monitoring the initial flight of an object in which multiple reflective areas or contrasting areas are located on the object which areas emit light to one or more cameras which receive a plurality of successive light patterns representing instances in the initial flight of the object. The light patterns received by the cameras are processed by a computer which compares known calibration light patterns with received signals from the object during flight to compute initial flight characteristics of the object.

It is a feature of the system that it is compact, automatic and portable and can be readily calibrated on site.

It is also a feature that the use of multiple reflective or contrasting areas on the object permits each camera to receive sufficient data despite initial object flight rotation.

It is also a feature of the system that the use of precisely located and predetermined reflective areas or markers on a calibration fixture or on the object permit ease of calibration.

BRIEF DESCRIPTION OF THE DRAWINGS

A more complete understanding of the invention may be obtained by reading the following description in conjunction with the appended drawing in which like elements are labeled similarly and in which.

BRIEF DESCRIPTION OF THE PREFERRED EMBODIMENT

Figure 1:
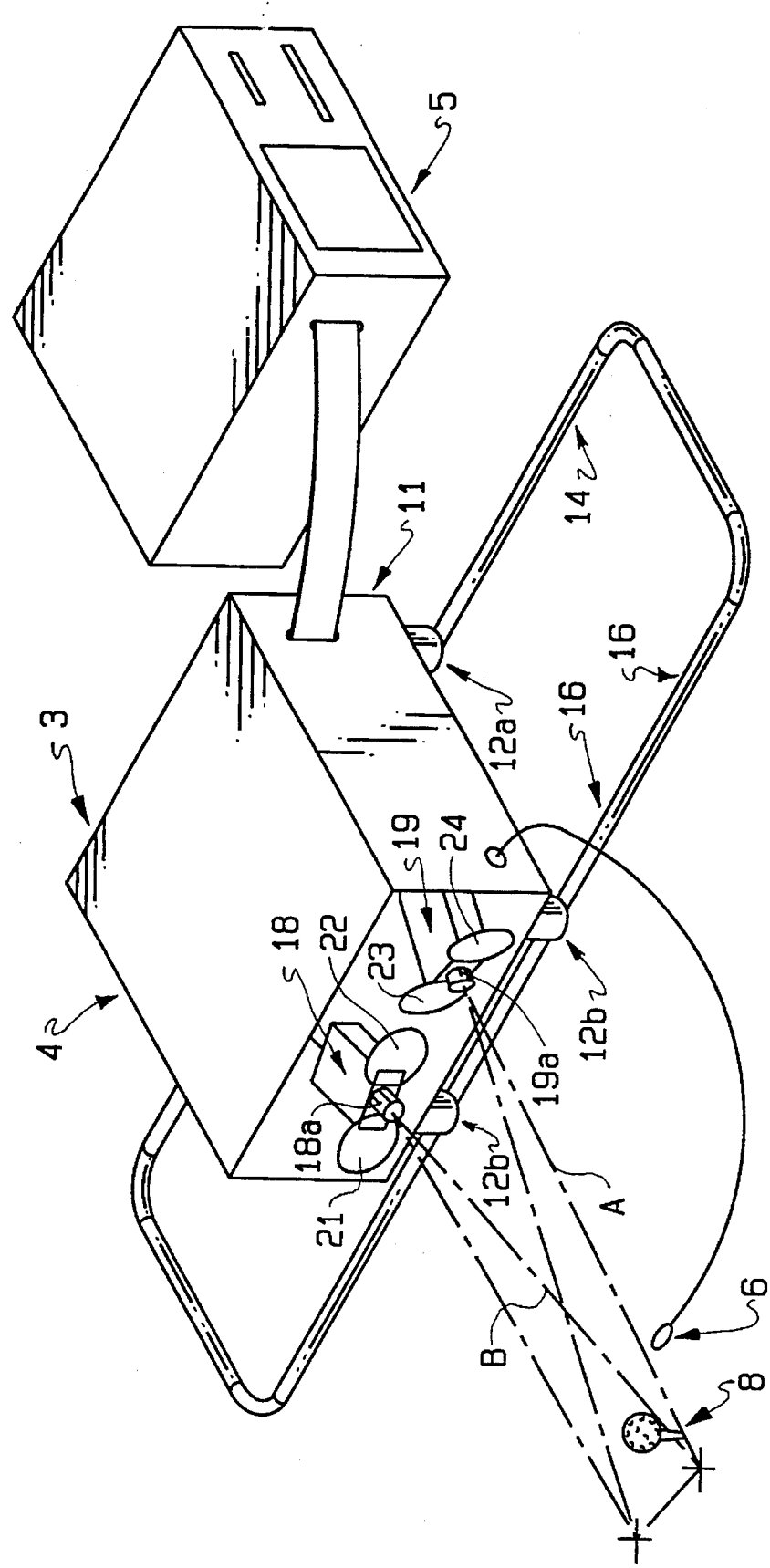
FIG. 1 is a perspective view of first embodiment of the present invention position adjacent a teed golf ball.

Referring to FIGS. 1–4, system 3 in FIG. 1 includes camera housing unit 4, computer 5, acoustical sensor 6 and teed golf ball 8. Camera unit 4 includes housing frame 11 and support feet 12a, 12b engageable with tracks 14, 16 so that unit 4 can be adjusted relative to teed ball 8. Camera unit 4 further includes two electro-optical spaced-apart cameras 18, 19, which cameras have light-receiving apertures 18a, 19a, shutters (not shown) and light sensitive silicon panels 18p, 19p (see FIG. 4). CCD cameras are preferred, but TV-type cameras are also useful.

Figure 2:
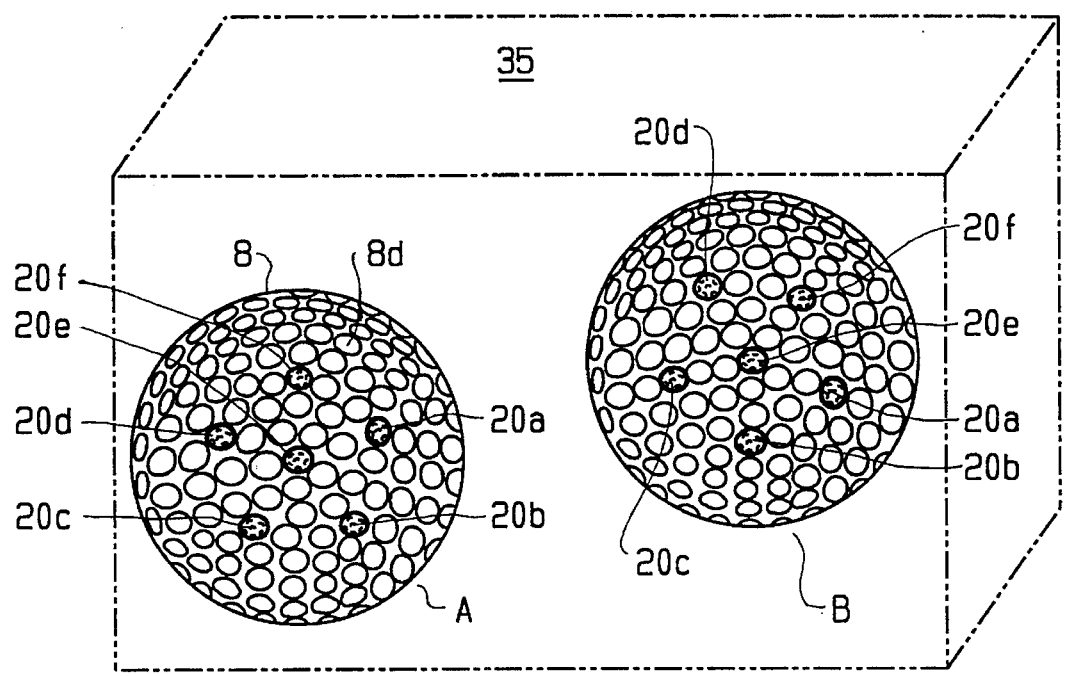
FIG. 2 is a perspective view of a three-dimensional field showing a golf ball passing through the field from position A to position B.

Turning to FIG. 2, golf ball 8 has dimples 8d and six (6) reflective spaced-apart round areas or dots 20a–f. Round dots 20a–f having diameters of one-tenth (1/10) to one-eighth (1/8) of an inch are preferred but other size and shaped areas can be used. Dots 20a–f are preferably made of reflective material which is adhered to the ball surface. The "Scotchlite" brand beaded material made by Minnesota Mining and Manufacturing (3M) is preferred. Coner-reflective retroflectors may also be used. Alternatively, painted spots can be used that define contrasting areas. The number of dots or areas may be as few as three (3) up to six (6) or more, provided each dot or area reflects light in ball positions A and B capable of being receivable by camera 18, 19. Camera 18 is capable of receiving light from each and every dot 20a–f and camera 19 is likewise capable of receiving light from each and every dot 20a–f. The angle between lines A and B on FIG. 1 may be in the range of 10°–30°, with 22° being preferable.

Reflective materials as compared with the coated surface of a golf ball are as high as nine hundred (900) times brighter where the divergence angle between the beam of light striking the dots 20a–f and the beam of light from the dots 20a–f to the camera aperture is zero or close to zero. As the divergence angle increases, the ratio of brightness of dots 20a–f to the background (remaining ball surface) decreases. It will be appreciated that infrared lighting may be used to make the flash light invisible to the golfer.

Adjacent to camera 18 are two flash lamps 21, 22 and adjacent to camera 19 are two additional flash lamps 23, 24. Lamps 21, 22, 23 and 24 are placed as close to the operative of camera 18, 19 as possible to minimize the divergence angle and this increases the ability of the cameras 18, 19 to receive light from dots 20a–f and distinguish that light from light received from other portions of the ball surface and other background light. Alternatively, gating or shuttering can be accomplished by controlling the periods of time in which the light sensitive panels 18p, 19p will receive light and be activated by such light. A camera in which shuttering or gating is accomplished by operation of the sensor panels is a gated charge intensified camera. In this alternative, the light source is always on with camera shutters always open, thus employing panels 18p, 19p to accomplish gating by gathering light only at two timed periods separated by 800 microseconds. A second alternative utilizes a ferroelectric liquid crystal shutter which opens and closes in 100 microseconds. In this alternative, a constant light source is used and shuttering occurs twice after the ball has been hit.

Figure 3:
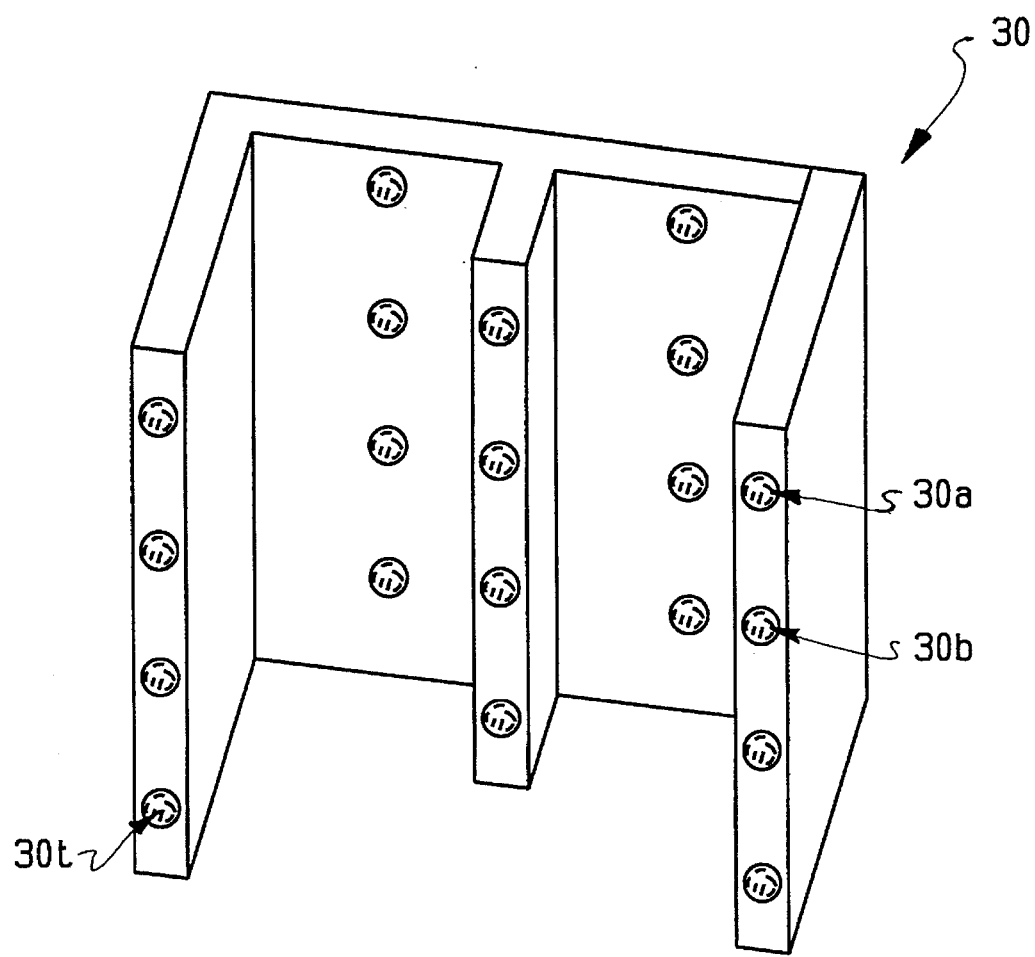
FIG. 3 is a perspective view of a calibration fixture carrying twenty illuminable areas.

In the operation of the system, the initial step is calibration of the cameras 18, 19. Cameras 18, 19 are calibrated to a coordinate system fixed in space. To accomplish this calibration, fixture 30 of FIG. 3 is physically located just ahead of where teed ball 8 will be placed. The fixture includes twenty (20) retro-dots 30a–t of ¼" in diameter. Fixture 30 defines the global coordinate system by its three dimensional structure. The location of fixture 30 and spacing of cameras 18, 19 from the fixture 30 or each other need not be precise since fixture 30 locates these when it determines the eleven constants for each camera 18, 19. The eleven constants determine the focal length, orientation and position of each camera 18, 19 given the premeasured points on fixture 30 and the twenty (20) U and V coordinates digitized on each camera's sensor panels 18p, 19p.

Figure 4:
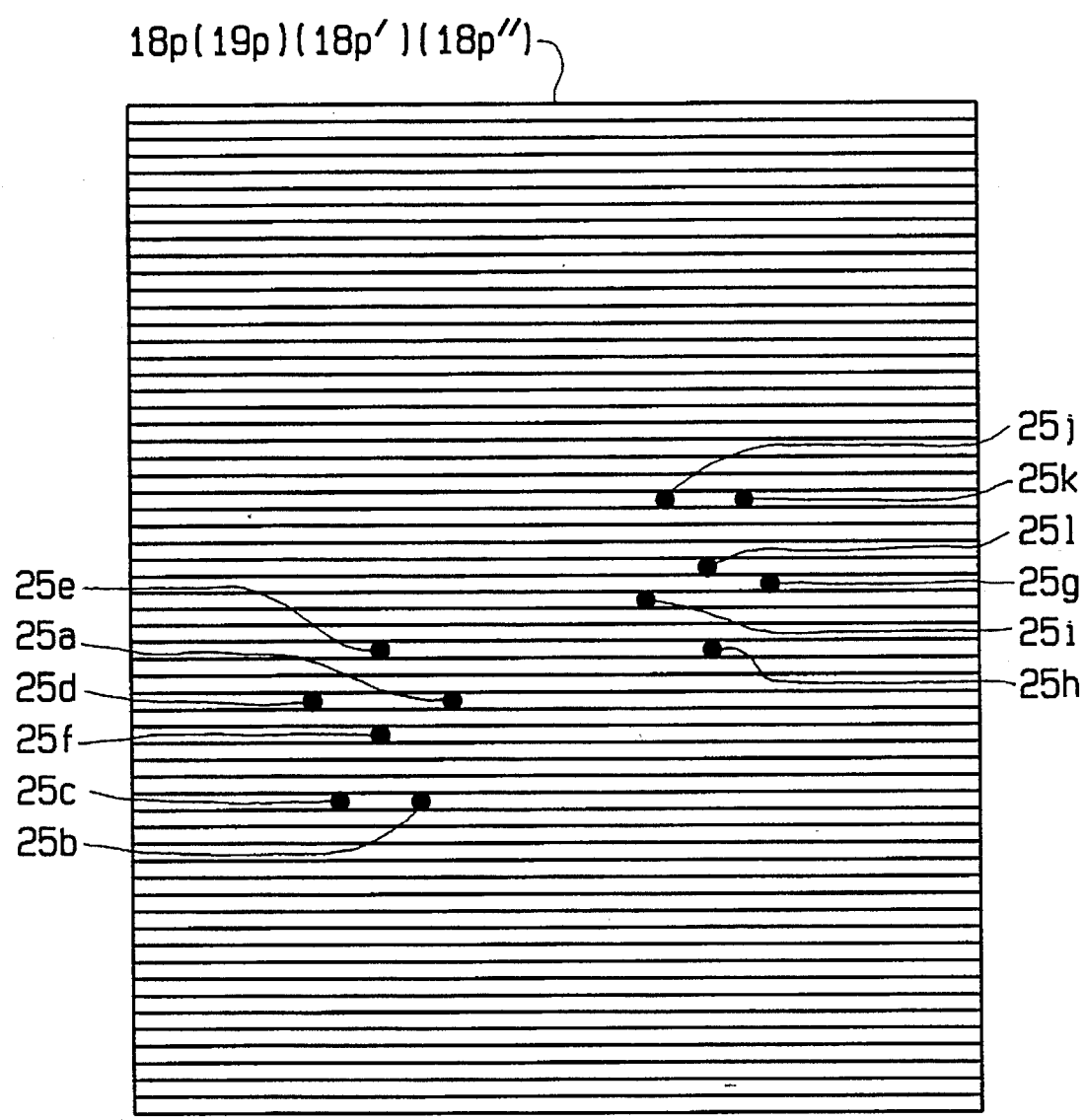
FIG. 4 is a plan view of the light receiving and sensory grid panel located in each camera.

Sensor panels 18p, 19p which receive a light pattern contain 240 lines of data and 510 pixels per line. The grid of FIG. 4 is merely illustrative in that it does not have 240 lines. A computer algorithm is used for centroid detection of each dot 20a–f. Centroid detection of a dot is the location of the center area of the dot for greater accuracy and resolution. Each image received from dots 20a–f results in an apparent X and Y center position. Where light is low in the field of vision due to gating, an image intensifier may be used in conjunction with the sensor panels. An image intensifier is a device which produces an output image brighter than the input image.

The X, Y and Z coordinates of the center of each dot 30a–t were premeasured to accuracy of one of one-ten thousandth of an inch on a digitizing table and stored in the computer. An image of calibration fixture 30 is taken by two cameras 18, 19. This image determines the eleven (11) constants relating image space coordinates U and V to the known twenty X, Y and Z positions on calibration fixture 30.

The equations relating the calibrated X(i), Y(i), Z(i) spaced points with the $U_i^{(j)}$, $V_i^{(j)}$ image points are:

$$U_i^{(j)} = \frac{D_{1j}X(i) + D_{2j}Y(i) + D_{3j}Z(i) + D_{4j}}{D_{9j}X(i) + D_{10j}Y(i) + D_{11j}Z(i) + 1}$$

$$V_i^{(j)} = \frac{D_{5j}X(i) + D_{6j}Y(i) + D_{7j}Z(i) + D_{8j}}{D_{9j}X(i) + D_{10j}Y(i) + D_{11j}Z(i) + 1}$$

$$i = 1,20$$
$$j = 1,2$$

The eleven constants, $D_{i1}$ (i=1, 11) for camera 18 and the eleven constants, $D_{i2}$ (i=1, 11) for camera 19 are solved from knowing X(i), Y(i), Z(i) at the twenty (20) locations and the twenty (20) $U_i(j)$, $V_i(j)$ coordinates measured in the calibration photographs for the two cameras.

With calibration completed, ball 8 which has been positioned about 30" from cameras 18 and 19 is struck and launched through three-dimensional field of view 35 (FIG. 2) Upon launch, the noise of striking is picked up by an acoustical sensor 6 which transmits a signal to open the shutter of camera 18 and camera 19 and to expose the image sensor panel in camera 18 and camera 19 to light from the six (6) ball dots. One hundred microseconds later, flash light 22 and light 23 fire a flash of light which illuminates the six (6) ball dots. Eight hundred (800) microseconds later flash light 24 and light 21 fire a flash of light to illuminate the six (6) ball dots which are about 4 to 6" along the initial flight path in field 35. Flashes of light are between one-ten thousandth and a few millionths of a second in duration. Very small apertures are used in cameras 18 and 19 to reduce ambient light and enhance strobe light. As light reflects off dots 20a–f in their two positions it reaches sensor panels 18p, 19p in corresponding panel areas 25a–f and 25g–l, respectively.

Using the known ball 8 dimensions, the known time between camera operation and the known geometric relationships between the cameras, the external computing circuits are able to calculate the X, Y and Z positions of each enhanced spot in a common coordinate system at the time of each snapshot. From the position information and the known data, the external computing circuits are able to calculate the ball velocity and spin in three dimensions during the immediate post-launch time period. Given the initial velocity and spin, plus known aerodynamic characteristics of golf ball 8, the external computing circuits are capable of accurately predicting the flight path and point of landing of the ball.

Three-dimensional monitoring of golf ball 8 that has a radius of 0.84" is accomplished by representing the X, Y, Z position of each dot on ball 8 by its center of mass location $T_x$, $T_y$, $T_z$ and its orientation matrix with angles A, E, T. The position of each dot (i-1, 2, ... 6) is given by the matrix coordinate transformation $$\begin{bmatrix} X(i) \\ Y(i) \\ Z(i) \end{bmatrix} = \begin{bmatrix} T_X \\ T_Y \\ T_Z \end{bmatrix} + [M(A,E,T)] \begin{bmatrix} 0.84 \sin \theta(i) \cos \phi(i) \\ 0.84 \sin \theta(i) \sin \phi(i) \\ 0.84 \cos \theta(i) \end{bmatrix}$$

in which $\theta(i)$, $\phi(i)$ are the spherical polar coordinate position of dots 20a–f on the surface of ball 8 and $$M(A,E,T) = \begin{bmatrix} M_{11} & M_{12} & M_{13} \\ M_{21} & M_{22} & M_{23} \\ M_{31} & M_{32} & M_{33} \end{bmatrix}$$

is the orientation matrix. The orientation matrix, M, gives the three dimensional orientation transformation connecting the body coordinates of ball 8 with the fix global reference coordinate system calibrated earlier. The column vectors (0.84 sin θ(i) cos φ(i), 0.84 sin θ(i) sin φ(i), 0.84 cos θ(i)), give the position of the $i^{th}$ dot in the body fixed coordinate system. The optimum arrangement of dots 20a–f is one pole dot at 0°, 0° and the five surrounding dots are at θ(i)=30° and φ(i)=0°, 72°, 144°, 216°, 288°. An angle of theta much greater than 40° will not allow all six dots on the ball in the optimum configuration of the system to be captured on severely hooked or sliced golf shots.

The resulting equations to be solved given the camera coordinates, $U_i^{(j)}$, $V_i^{(j)}$, for the six dots, i, and two cameras, j, are as follows:

$$U_i^{(j)} = \frac{D_{1j}X(i) + D_{2j}Y(i) + D_{3j}Z(i) + D_{4j}}{D_{9j}X(i) + D_{10j}Y(i) + D_{11j}Z(i) + 1}$$

$$V_i^{(j)} = \frac{D_{5j}X(i) + D_{6j}Y(i) + D_{7j}Z(i) + D_{8j}}{D_{9j}X(i) + D_{10j}Y(i) + D_{11j}Z(i) + 1}$$

$$i = 1,6$$
$$j = 1,2$$

The resulting twenty-four (24) equations are solved for $T_x$, $T_y$, $T_z$ and orientation angles A, E, T for the ball's first location, A. A similar set of twenty-four equations are solved for in the second location position, B, of the ball. The twenty-four (24) equations are nonlinear and are solved iteratively by using a linearization of Taylor's theorem. Generally, the equations converge to a solution for the six unknown parameters in four iterations.

The velocity components of the ball along the three axes of the coordinate system are then computed from the formulas:

$$V_x = \frac{T_x(t+\Delta T) - T_x(t)}{\Delta T}$$

$$V_y = \frac{T_y(t+\Delta T) - T_y(t)}{\Delta T}$$

$$V_z = \frac{T_z(t+\Delta T) - T_z(t)}{\Delta T}$$

in which $\Delta T$ is the time interval between strobe firings.

The spin components result from multiplying the orientational matrix $M(A,E,T,t)$ and $M(A',E',T',t+\Delta T)$ and equating the off diagonal elements of the resulting relative orientation matrix.

$$A(t,t+\Delta T) = M(t+\Delta T) M^T(t)$$

Then the magnitude, $\theta$, of the angle of rotation vector of the two balls during the time increment $\Delta T$ is given by:

$$\theta = \sin^{-1}(R/2)$$

where $$R = \sqrt{L^2 + M^2 + N^2}$$

$L = A_{32} - A_{23}$
$M = A_{13} - A_{31}$
$N = A_{21} - A_{12}$

The three orthogonal components of spin rate, $W_x$, $W_y$, $W_z$, are given by:

$$W_x = \sin^{-1}(R/2) L/(R\Delta T) = \theta L/(R\Delta T)$$

$$W_y = \sin^{-1}(R/2) M/(R\Delta T) = \theta M/(R\Delta T)$$

$$W_z = \sin^{-1}(R/2) N/(R\Delta T) = \theta N/(R\Delta T)$$

Figure 5:
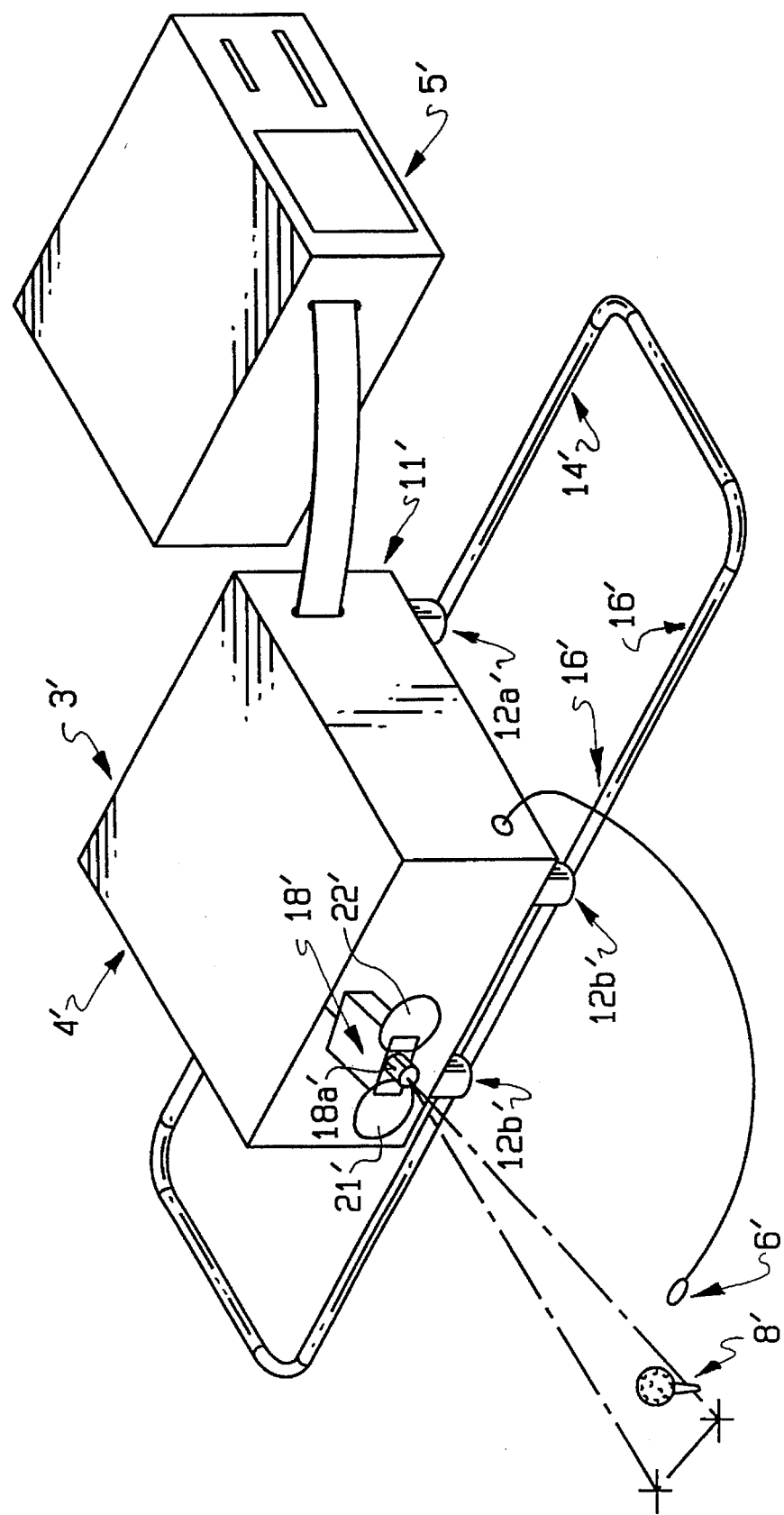
FIG. 5 is a perspective view of a second embodiment of the present invention using one camera.
Figure 6:
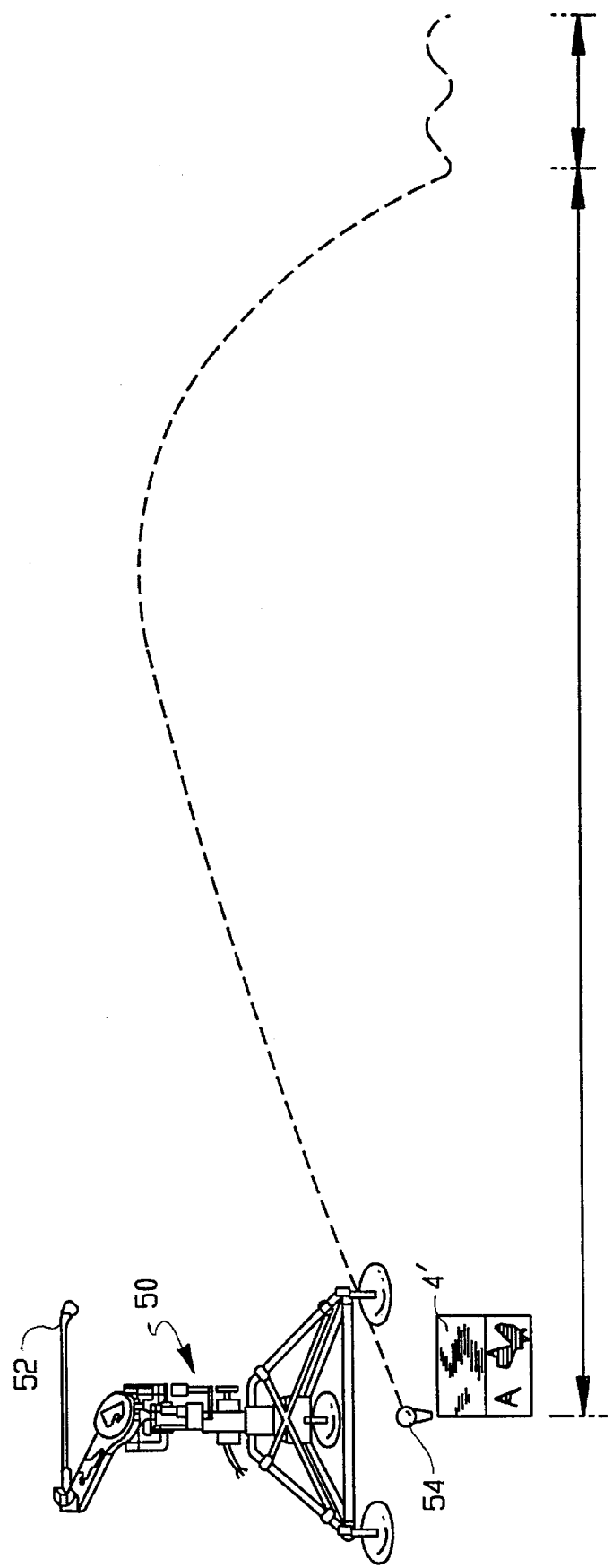
FIG. 6 is a schematic illustrating the trajectory of a ball hit by a driving machine.

Referring to an alternative embodiment of the invention and FIGS. 5 and 6, system 3' includes camera housing unit 4', computer 5', acoustical sensor 6' and teed golf ball 8'. Camera unit 4' includes housing frame 11' and support feet 12a', 12b' engageable with tracks 14', and 16' so that unit 4' can be adjusted relative to teed ball 8'. Camera unit 4' further includes an electro-optical camera 18', which camera has light-receiving aperture 18a', shutter (not shown) and light sensitive silicon panels 18p' similar to the panels of FIG. 4. A CCD camera is preferred but TV-type cameras are also useful. Camera 18' in this one-camera system preferably has a higher resolution (754×244 pixel CCD array) than the camera 18 in the two-camera system (510×240 pixels).

Adjacent to camera 18' are two flash lamps 21', 22'. Lamps 21' and 22' are placed as close to the operative of camera 18' as possible to minimize the divergence angle and this increases the ability of camera 18' to receive light from ball dots 20a–f and distinguish that light from light received from other portions of the ball surface and other background light.

In the operation of this one camera system, the initial step is calibration of camera 18'. Camera 18' is calibrated to a coordinate system fixed in space in the same manner of the two-camera embodiment. To accomplish this calibration, fixture 30 of FIG. 3 is physically located just ahead of where teed ball 8' will be placed. The fixture includes twenty (20) retro-dots 30 a–t of ¼" in diameter. Fixture 30 defines the global coordinate system by its three dimensional structure. The location of fixture 30 and spacing of camera 18' from fixture 30 or each other need not be precise since fixture 30 locates these when it determines the eleven constants for camera 18'. The eleven constants determine the focal length, orientation and position of camera 18' given the premeasured points on fixture 30 and the twenty (20) U and V coordinates digitized on camera's sensor panel 18p' (FIG. 4).

The X, Y and Z coordinates of each dot 20a–f were premeasured to an accuracy of one of one-ten thousandth of an inch on a digitizing table and stored in the computer. An image of the calibration fixture 30 is taken by camera 18'. This image determines the eleven (11) constants relating image space coordinates U and V to the known twenty (20) X, Y and Z positions on calibration fixture 30.

The equations relating to the calibrated X(i), Y(i), Z(i) spaced points with the $U_i$, $V_i$ image points are:

$$U_i = \frac{D_1 X(i) + D_2 Y(i) + D_3 Z(i) + D_4}{D_9 X(i) + D_{10} Y(i) + D_{11} Z(i) + 1}$$

$$V_i = \frac{D_5 X(i) + D_6 Y(i) + D_7 Z(i) + D_8}{D_9 X(i) + D_{10} Y(i) + D_{11} Z(i) + 1}$$

$i = 1,20$

The eleven constants, $D_i$ (i=1,11) for camera 18' are solved from knowing X(i), Y(i), Z(i) at the 20 locations and the 20 $U_i$, $V_i$ coordinates measured in the calibration picture. A typical fit of the U, V coordinates to the measured U, V coordinates is given in Table I. A pixel accuracy of 0.1 pixel is usually obtained.

TABLE I

| FITTED VALUE | V | U DIFFERENCE | V DIFFERENCE | MEASURED VALUE U | V |
|---|---|---|---|---|---|
| 96.55 | 74.54 | −0.05 | −0.03 | 96.50 | 74.51 |
| 225.59 | 89.15 | 0.01 | 0.01 | 225.60 | 89.16 |
| 338.89 | 81.81 | 0.03 | −0.11 | 338.92 | 81.70 |
| 440.99 | 88.37 | −0.15 | 0.16 | 440.84 | 88.53 |
| 586.06 | 72.99 | 0.01 | 0.07 | 586.07 | 73.06 |
| 97.42 | 126.57 | −0.09 | 0.03 | 97.33 | 126.60 |
| 226.64 | 134.78 | 0.14 | 0.04 | 226.78 | 134.82 |
| 340.16 | 130.69 | 0.03 | −0.17 | 340.19 | 130.52 |
| 442.48 | 134.10 | 0.09 | −0.04 | 442.57 | 134.06 |
| 587.94 | 124.86 | 0.09 | −0.08 | 588.03 | 124.78 |
| 97.81 | 179.04 | 0.19 | 0.10 | 98.00 | 179.14 |
| 227.26 | 180.76 | −0.10 | 0.01 | 227.16 | 180.77 |
| 341.19 | 179.62 | −0.03 | −0.12 | 341.16 | 179.50 |

TABLE I-continued

| FITTED VALUE | V | U DIFFERENCE | V DIFFERENCE | MEASURED VALUE U | V |
|---|---|---|---|---|---|
| 443.09 | 180.08 | −0.06 | 0.01 | 443.03 | 180.09 |
| 589.01 | 177.07 | −0.06 | 0.10 | 588.95 | 177.17 |
| 98.43 | 231.63 | −0.02 | −0.01 | 98.41 | 231.62 |
| 227.76 | 226.83 | −0.06 | 0.02 | 227.70 | 226.85 |
| 342.05 | 228.69 | −0.10 | 0.05 | 341.95 | 228.74 |
| 443.91 | 226.14 | 0.17 | −0.05 | 444.08 | 226.09 |
| 590.73 | 229.46 | −0.05 | 0.00 | 590.68 | 229.46 |
| AVERAGE STANDARD DEVIATION | | 0.10 | 0.08 | | |

With calibration completed, ball 8' which has been positioned about 25" from camera 18' is struck and launched through three-dimensional field of view 35 (FIG. 2). Upon launch, the noise of striking is picked up by an acoustical sensor 6' which transmits a signal to open the shutter of camera 18' to light from the six (6) ball dots. One hundred microseconds later, flash light 22' fires a flash of light which illuminates the six (6) ball dots. Eight hundred (800) micro seconds later flash light 21' fires a flash of light to illuminate the six (6) ball dots which are about 3 to 5" along the initial flight path in field 35. Flashes of light are between one-ten thousandth and a few millionths of a second in duration. Very small apertures are used in camera 18' to reduce ambient light and enhance strobe light. As light reflects off dots 20a–f in their two positions it reaches sensor panel 18p' in corresponding panel areas 25a–f and 25g–l, respectively. The same type of sensor panel as shown in FIG. 4 is used in the one camera system.

Using the known dimensions of golf ball 8', the known time between camera operations and the known calibration equations of the camera, the external computing circuits are able to calculate the X, Y and Z positions of each enhanced spot in a common coordinate system at the time of each snapshot. From the position information and the known data, the external computing circuits are able to calculate the ball velocity and spin in three dimensions during the immediate post-launch time period. Given the initial velocity and spin, plus known aerodynamic characteristics of the ball 8', the external computing circuits are capable of accurately predicting the flight path and point of landing of the ball.

Three-dimensional monitoring of ball 8' that has a radius of 0.84" is accomplished by representing the X, Y, Z position of each dot on ball 8' by its center of mass location $T_x$, $T_y$, $T_z$ and its orientation matrix with angles A, E, T. The position of each dot (i-1, 2, . . . 6) is given by the matrix coordinate transformation $$\begin{bmatrix} X(i) \\ Y(i) \\ Z(i) \end{bmatrix} = \begin{bmatrix} T_X \\ T_Y \\ T_Z \end{bmatrix} + [M(A,E,T)] \begin{bmatrix} 0.84 \sin \theta(i) \cos \phi(i) \\ 0.84 \sin \theta(i) \sin \phi(i) \\ 0.84 \cos \theta(i) \end{bmatrix}$$

in which $\theta(i)$, $\phi(i)$ are the spherical polar coordinate position of the dots 20a–f on the surface of ball 8' and $$M(A,E,T) = \begin{bmatrix} M_{11} & M_{12} & M_{13} \\ M_{21} & M_{22} & M_{23} \\ M_{31} & M_{32} & M_{33} \end{bmatrix}$$

is the orientation matrix. The orientation matrix, M, gives the three dimensional orientation transformation connecting the body coordinates of ball 8' with the fix global reference coordinate system calibrated earlier. The column vectors (0.84 sin $\theta(i)$ cos $\phi(i)$, 0.84 sin $\theta(i)$ sin $\phi(i)$, 0.84 cos $\theta(i)$), give the position of $i^{th}$ dot in the body fixed coordinate system. The optimum arrangement of dots 20a–f is one pole dot at 0°, 0° and the five surrounding dots are at $\theta(i)$=37° and $\phi(i)$=0°, 72°, 144°, 216°, 288°. An angle of theta much greater than 50° will not allow all six dots on the ball in the optimum configuration of the system to be captured on severely hooked or sliced golf shots.

The resulting equations to be solved given the camera coordinates, $U_i$, $V_i$, for the six dots, i, are as follows:

$$U_i = \frac{D_1 X(i) + D_2 Y(i) + D_3 Z(i) + D_4}{D_9 X(i) + D_{10} Y(i) + D_{11} Z(i) + 1}$$

$$V_i = \frac{D_5 X(i) + D_6 Y(i) + D_7 Z(i) + D_8}{D_9 X(i) + D_{10} Y(i) + D_{11} Z(i) + 1}$$

$$i = 1,6$$

The resulting twelve equations are solved for $T_x$, $T_y$, $T_z$ and orientation angles A, E, T for the ball's first location, A. A similar set of twelve equations are solved for in the second location position of the ball, B. The twelve (12) equations are nonlinear and are solved iteratively by using a linearization of Taylor's theorem. Generally, the equations converge to a solution for the six unknown parameters in eight iterations.

The velocity components of the ball along the three axes of the coordinate system are then computed from the formulas:

$$V_x = \frac{T_x(t + \Delta T) - T_x(t)}{\Delta T}$$

$$V_y = \frac{T_y(t + \Delta T) - T_y(t)}{\Delta T}$$

$$V_z = \frac{T_z(t + \Delta T) - T_z(t)}{\Delta T}$$

in which $\Delta T$ is the time interval between strobe firings.

The spin components result from multiplying the orientational matrix $M(A,E,T,t)$ and $M(A',E',T',t+\Delta T)$ and equating the off diagonal elements of the resulting relative orientation matrix.

$$A(t,t+\Delta T) = M(t+\Delta T)M^T(t)$$

Then the magnitude, $\theta$, of the angle of rotation vector of the two balls during the time increment $\Delta T$ is given by:

$$\theta = \sin^{-1}(R/2)$$

where $$R = \sqrt{L^2 + M^2 + N^2}$$

$L = A_{32} - A_{23}$
$M = A_{13} - A_{31}$
$N = A_{21} - A_{12}$

The three orthogonal components of spin rate, $W_x$, $W_y$, $W_z$, are given by:

$$W_x = \sin^{-1}(R/2)L/(R\Delta T) = \theta L/(R\Delta T)$$

$$W_y = \sin^{-1}(R/2)M/(R\Delta T) = \theta M/(R\Delta T)$$

$$W_z = \sin^{-1}(R/2)N/(R\Delta T) = \theta N/(R\Delta T)$$

Turning again to FIG. 6 to the method of accomplishing a test of the current camera system is depicted. An adjustable mechanical golf ball driving unit 50 is used with a golf club 52 for striking a golf ball 54 with retroreflective dots. A unit 4' (FIG. 5) is used for determining the launch conditions. The mechanical driving unit 50, suitably the mechanical golfer available from True Temper Corporation, is adjusted to give the launch angle, spin velocity and initial velocity desired for the particular test.

By adjusting the pressure of the machine to 92 psi and using a 4-iron, launch data was generated and analyzed for repeatability with unit 4'. Three golf balls were marked with circular retroreflective material at five (5) positions of 37° from a center marking as shown in FIG. 2. The three balls were hit twice and generated the data shown in Table II.

The U and V values are the actual pixel values measured on the CCD array. The U coordinate may have a value of 1 to 754 and the V coordinate a value of 1 to 244. V and V are the pixel location on the sensor or sensors $18p'$, $19p'$.

The three components of velocity were transformed to velocity magnitude, and two angles defined as follows:

$$\text{Ball Velocity} = \sqrt{(V_x^2 + V_y^2 + V_z^2)}$$

$$\text{Launch} \angle = \tan^{-1}\left(\frac{V_y}{\sqrt{V_z^2 + V_x^2}}\right)$$

$$\text{Side} \angle = \tan^{-1}\left(\frac{V_x}{V_z}\right)$$

As shown in Table II, the variation in side angle is the most pronounced, percentage wise, relative to the other measured parameters.

TABLE II

| SHOT #1 | BALL VELOCITY | LAUNCH ANGLE | SIDE ANGLE | $W_x$ | $W_y$ | $W_z$ |
|---|---|---|---|---|---|---|
| 1 | 122.5 | 15.9 | -2.1 | -4900 | 531 | -10 |
| 2 | 123.3 | 16.0 | 0.0 | -4666 | 193 | 64 |
| 3 | 123.2 | 15.5 | -1.4 | -4792 | 343 | 112 |
| 4 | 122.7 | 15.7 | -1.4 | -4884 | 282 | 58 |
| 5 | 122.9 | 15.9 | -0.1 | -4592 | 285 | 53 |
| 6 | 122.9 | 15.4 | -1.4 | -4707 | 348 | 22 |
| Average | 122.9 | 15.7 | -1.1 | -4757 | 330 | 50 |
| STD | 0.3 | 0.2 | 0.8 | 123 | 113 | 41 |

In Table III, the clubface was rotated to hit sliced shots and the six shots were repeated.

TABLE III

| SHOT #1 | BALL VELOCITY | LAUNCH ANGLE | SIDE ANGLE | $W_x$ | $W_y$ | $W_z$ |
|---|---|---|---|---|---|---|
| 1 | 116.7 | 20.9 | 4.5 | -4963 | -1159 | -21 |
| 2 | 118.2 | 19.9 | 6.6 | -5370 | -1537 | 59 |
| 3 | 118.7 | 19.3 | 7.8 | -5903 | -1561 | 27 |
| 4 | 116.3 | 19.7 | 9.5 | -5621 | -1531 | 56 |
| 5 | 118.0 | 19.7 | 7.6 | -5668 | -1549 | 32 |
| 6 | 118.5 | 19.5 | 8.6 | -5640 | -1498 | -13 |
| Average | 117.7 | 19.8 | 7.4 | -5528 | -1473 | 23 |
| STD | 1.0 | 0.6 | 1.7 | 324 | 155 | 34 |

Finally, in Table IV, the club face was positioned to hit hook shots and again similar results for variation in the six parameters were obtained.

TABLE IV

| SHOT #1 | BALL VELOCITY | LAUNCH ANGLE | SIDE ANGLE | $W_x$ | $W_y$ | $W_z$ |
|---|---|---|---|---|---|---|
| 1 | 123.9 | 13.0 | −5.7 | −3881 | 1860 | −51 |
| 2 | 124.9 | 13.4 | −4.0 | −3615 | 1320 | −16 |
| 3 | 125.3 | 12.9 | −4.9 | −3719 | 1429 | 23 |
| 4 | 124.2 | 13.1 | −5.4 | −3856 | 1566 | 35 |
| 5 | 124.8 | 13.3 | −4.2 | −3629 | 1349 | −68 |
| 6 | 124.5 | 13.0 | −3.8 | −3746 | 1523 | 19 |
| Average | 124.6 | 13.1 | −4.7 | −3741 | 1508 | −10 |
| STD | 0.5 | 0.2 | 0.8 | 111 | 197 | 43 |

$W_x$, $W_y$ and $W_z$ values are the three orthogonal components of ball spin rate. The spin components $W_x$, $W_y$ and $W_z$, are measured in RPMs (revolutions per minute).

Figure 7:
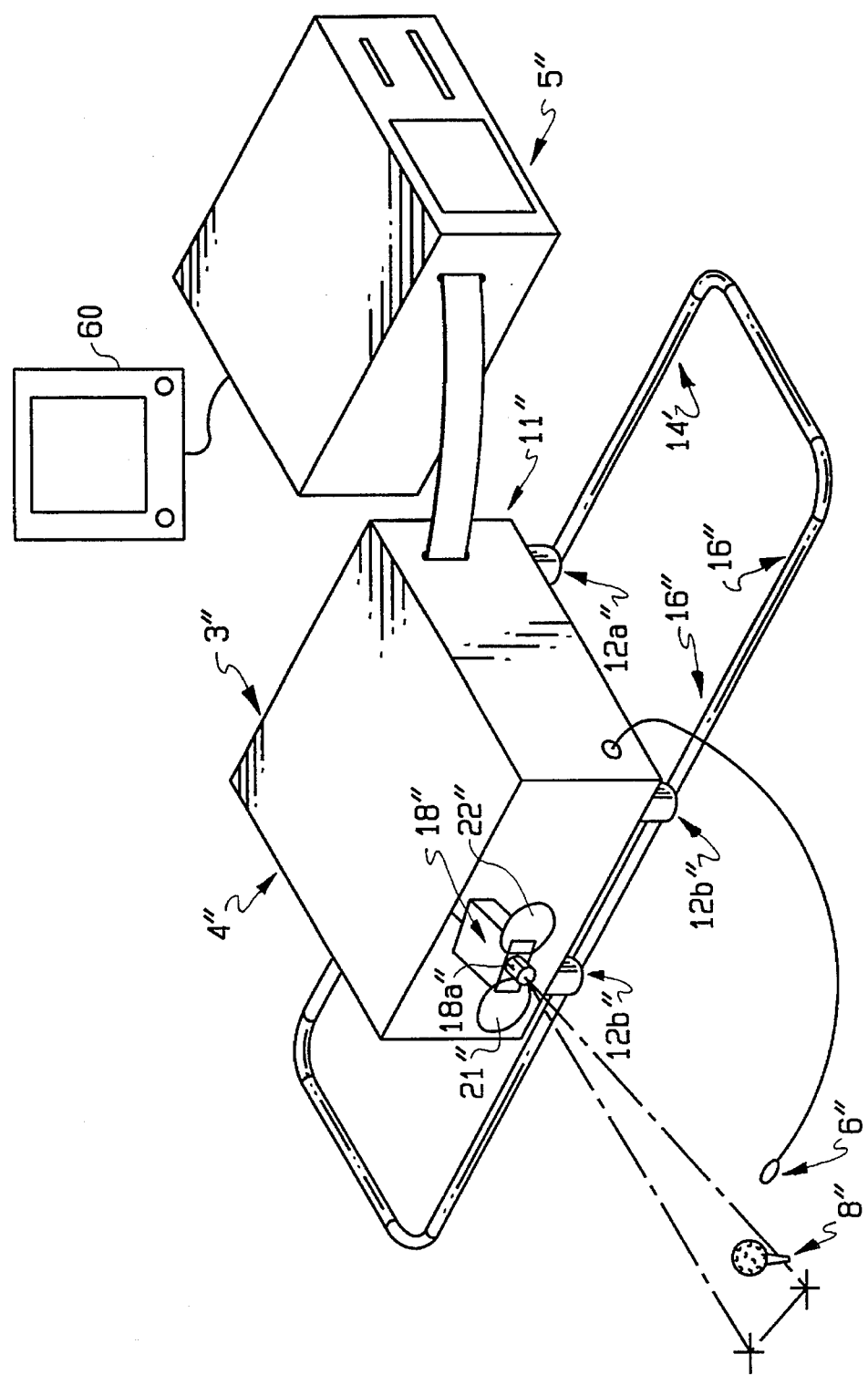
FIG. 7 is a perspective view of a third embodiment of the present invention using one camera.

According to another aspect of the invention, shown in FIG. 7 is a third embodiment of the present invention similar to that of FIG. 5, except that no calibration fixture 30 is needed because the precise locations of the illuminable dots or markers on ball 8" are predetermined, that is precisely calibrated. Preferably, the illuminable dots or markers are made of reflective material which adhered to the surface of ball 8", such as the "Scotchlite" brand.

Monitoring system 3" includes camera housing unit 4", computer 5", acoustical sensor 6", teed calibrated golf ball 8" and flight display unit 60. Camera unit 4" further includes a camera 18', which camera has light-receiving aperture 18a", shutters (not shown) and light sensitive silicon sensor panel 18p" similar to the panel of FIG. 4. A CCD camera (754×244 pixels) is preferred, but TV-type cameras may also be used.

Adjacent to camera 18" are two flash lamps 21" and 22". Preferably, lamps 21" and 22" are placed as close as possible to camera 18" to minimize the divergence angle and this increases the ability of camera 18" to receive light from markers A–F and distinguish that light from light received from other portions of the ball surface and other background light.

Based on the photographic equations discussed below, the launch conditions of the ball, such as the components of velocity and spin rate, are transmitted to computer 5." Included with these launch conditions, computer 5" also has initially programmed into it information on the flight characteristics of ball 8". Once initial flight data is measured and analyzed, the projected ball flight may then be presented on display screen 60, preferably on a television or CRT, that may also contain a background of different golf courses to simulate play realism.

Figure 8:
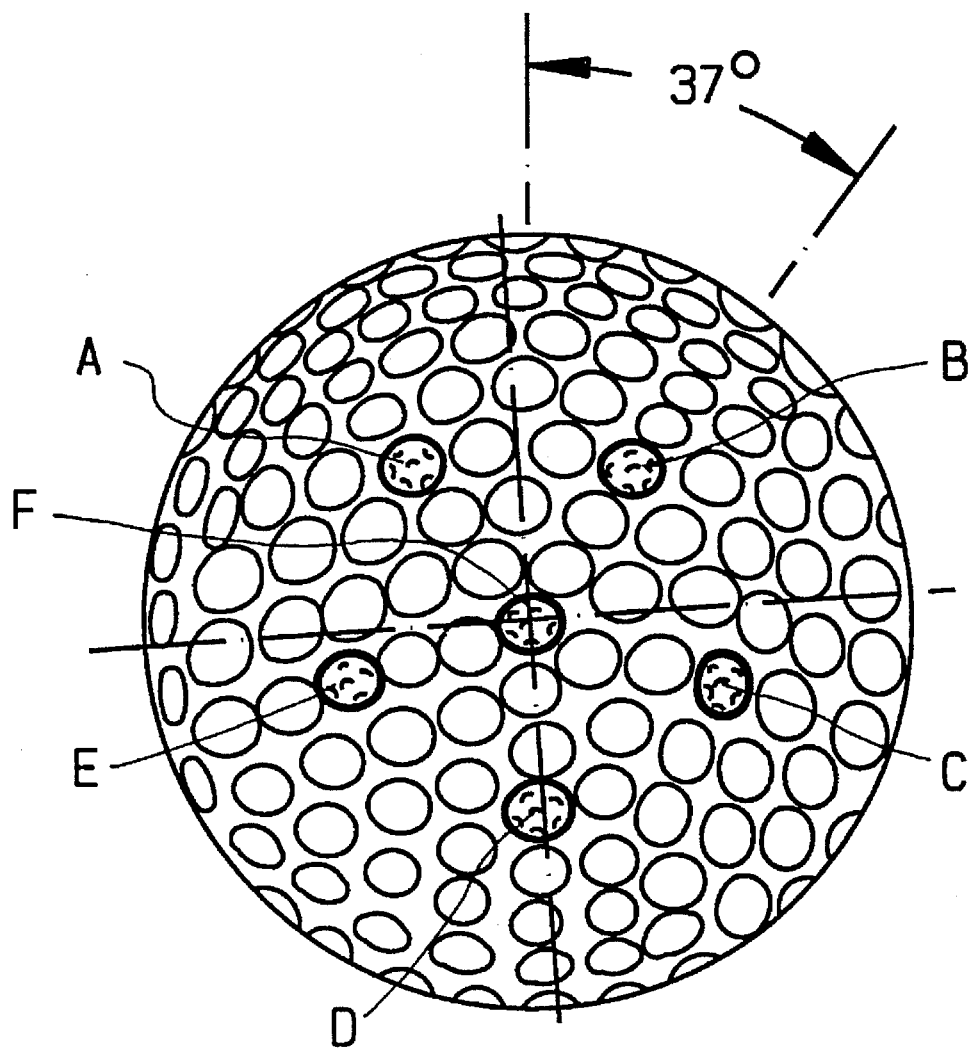
FIG. 8 is a plan view of a ball having six illuminable markers.

Referring to FIG. 8, calibrated golf ball 8" has illuminable markers A–F positioned precisely on its surface as set forth below. Markers A–F are preferably circular and have diameters of approximately 0.1–0.2" and fit into the dimple indentation for accurate positioning. Markers A–F are positioned to ±0.37°.

| Marker Letter | Degrees | Latitude Minutes | Sec. | Degrees | Longitude Minutes | Sec. |
|---|---|---|---|---|---|---|
| A | 216 | 0 | 0 | 37 | 0 | 0 |
| B | 144 | 0 | 0 | 37 | 0 | 0 |
| C | 72 | 0 | 0 | 37 | 0 | 0 |
| D | 0 | 0 | 0 | 37 | 0 | 0 |
| E | 288 | 0 | 0 | 37 | 0 | 0 |
| F | 0 | 0 | 0 | 0 | 0 | 0 |

In the operation of this one-camera system, sensor panel 18p" is aligned with the platform such that the normal to its planar surface is perpendicular to gravity and its orientation is parallel to the downrange direction of the intend flight of golf ball 8". Such an alignment may be effected by bubble balancing the camera such that the Y-axis of sensor panel 18p" lies in the direction of gravity and the X-axis points towards the landmark at which the golfer should hit the ball.

Figure 9:
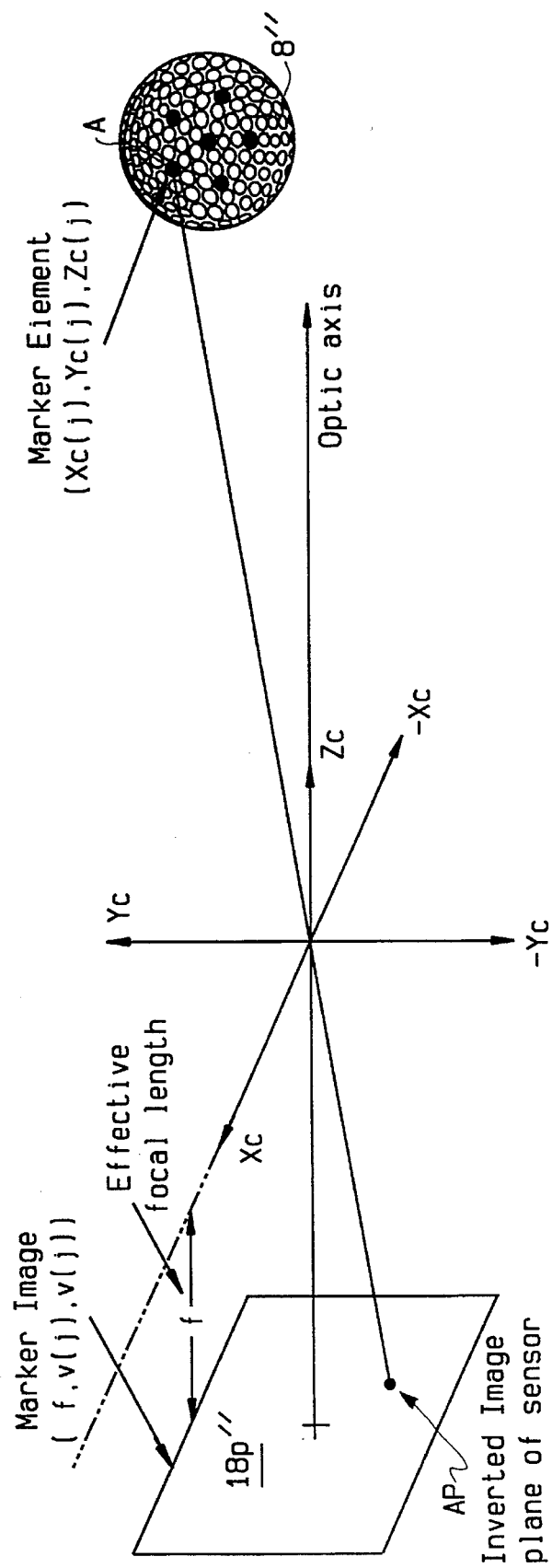
FIG. 9 is a schematic diagram illustrating the optical system of the monitoring system of FIG. 7.

Turning to FIG. 9, rays of light reflected off of markers A–F pass along optical axis 61 of the lens (not shown) of camera 18". That lens has an effective focal length, f, of ~25 mm and images the reflected rays off of markers A–F onto image sensor plane 4". For example, marker A is projected on sensor plane 18p" at point Ap. Those skilled in the art will readily note that the lens forms an inverted image of the markers on sensor plane 18p".

To calculate the center of each circular markers A–F, such as A, a centroid averaging procedure is utilized, including a computer algorithm. In carrying out such centroid averaging, the center position of the highly contrasted marker A–F is found by summing over the pixel positions of all pixels about the marker A–F that have an intensity level above a threshold gray level and dividing then by the number of pixel elements in the sum. The thresholding operation segments the image into distinctly contrasted regions similar to that illustrated in FIG. 4 for the first embodiment of the present invention.

The photogrammetric equations relating the calibrated $X_c(j)$, $Y_c(j)$ and $Z_c(j)$ coordinates of the markers with the center image coordinates $U(j)$ and $V(j)$ of the markers are similar to those of the first two embodiments of the present invention and are generally given by:

$$U(j) = f\left[\frac{X_c(j)}{Z_c(j)}\right]$$

$$V(j) = f\left[\frac{Y_c(j)}{Z_c(j)}\right]$$

These equations determine the constants relating the image space coordinates U and V to the precisely known six (6) marker positions, $X_c(j)$, $Y_c(j)$, $Z_c(j)$, on calibrated golf ball 8".

When golf ball 8", which is about 25" from camera 18", is struck, it is launched through a three-dimensional field of view 35, as depicted in FIG. 2 except for dots 20a–f replaced with markers A–F. Upon launch, the noise of striking is picked up by acoustical sensor 6" which transmits a signal to open the shutter of camera 18" to ambient light from field of view 35. One hundred microseconds later, flash light 22 fires a flash of light which illuminates the six (6) ball markers A–F. Eight hundred (800) microseconds later, flash light 21 fires a flash of light to illuminate the six (6) ball dots which are about 3 to 5" along the initial flight path in field 35. Flashes of light are between one-ten thousandth and a few millionths of a second in duration. Very small apertures are used in camera 18" to reduce ambient light and enhance strobe light.

As light reflects off ball markers A–F in their two positions, it reaches sensor panel 4" in corresponding panel areas 25a–f and 25g–l, respectively, as depicted in FIG. 4.

Using the known dimensions of golf ball 8", its known flight characteristics based on simple patterns, weight distribution and so forth, the known time between camera operations (snap-shots) and the above collinearity or photogrammetric equations, the computing circuits in computer 5" calculates the $X_c$, $Y_c$ and $Z_c$ positions of each enhanced marker A–F in a common coordinate system at the time of each snapshot.

The constraint condition between markers A–F of a rigid body (ball 8") allow the above photogrammetric equations to be solved with a minimum of three markers. The rigidity constraint adds nonlinearity or nonuniqueness. This nonuniqueness, however, can be overcome by using additional markers as in this embodiment that provide the determinism to solve the equations.

From the positional information and referred-to known data, the computing circuits of computer 5" operate to calculate the velocity and spin in three dimensions of golf ball 8" during the immediate post-launch time period. Given the initial velocity and spin, plus known aerodynamic flight characteristics of ball 8", the computing circuits are capable of accurately predicting the flight path and point of landing of golf ball 8".

Three-dimensional monitoring of golf ball 8" that has a radius of 0.84" is accomplished by representing the $X_c$, $Y_c$, $Z_c$ position of each marker on ball 8" by its center of mass location $T_x$, $T_y$, $T_z$ and its orientation matrix with angles A, E, T. The position of each marker (j-1, 2, ... 6), $X_c(j)$, $Y_c(j)$, $Z_c(j)$ in camera 18" is given by the matrix coordinate transformation:

$$\begin{pmatrix} X_c(j) \\ Y_c(j) \\ Z_c(j) \end{pmatrix} = \begin{pmatrix} T_x \\ T_y \\ T_z \end{pmatrix} + M(A,E,T) \begin{pmatrix} 0.84 \sin \theta(j) \cos \phi(j) \\ 0.84 \sin \theta(j) \sin \phi(j) \\ 0.84 \cos \theta(j) \end{pmatrix}$$

in which $\theta(j)$, $\phi(j)$ are the spherical polar coordinate position of markers A–F on the surface of ball 8" and the orientation matrix is $$M(A,E,T) = \begin{bmatrix} M_{11} & M_{12} & M_{13} \\ M_{21} & M_{22} & M_{23} \\ M_{31} & M_{32} & M_{33} \end{bmatrix}$$

The orientation matrix, M, gives the three-dimensional orientation transformation connecting the body coordinates of ball 8" with the fixed camera 18" reference coordinate system. The column vectors (0.84 sin $\theta(j)$ cos $\phi(j)$, 0.84 sin $\theta(j)$ sin $\phi(j)$, 0.84 cos $\theta(j)$, give the position of the $j^{th}$ marker in the body fixed coordinate system. The optimum arrangement of markers A–F is one at 0°, 0° and the five surrounding markers at $\theta(j)$=37° and $\phi(j)$=0°, 72°, 144°, 216°, 288°. An angle of theta much greater than 50° will not allow all six (6) markers on the ball in the optimum configuration of the system to be captured on severely hooked or sliced golf shots.

The resulting equations to be solved given the camera coordinates, $U_{(j)}$, $V_{(j)}$, for the six markers, j, are as follows and j=1,6:

$$U(j) = f\left[ \frac{T_x + M_{11}X_B(j) + M_{12}Y_B(j) + M_{13}Z_B(j)}{T_z + M_{31}X_B(j) + M_{32}Y_B(j) + M_{33}Z_B(j)} \right]$$

$$V(j) = f\left[ \frac{T_y + M_{21}X_B(j) + M_{22}Y_B(j) + M_{23}Z_B(j)}{T_z + M_{31}X_B(j) + M_{32}Y_B(j) + M_{33}Z_B(j)} \right]$$

in which $X_B(j)$, $Y_B(j)$ and $Z_B(j)$ are the cartesian coordinates represented earlier as spherical polar coordinates that describe the body coordinate position of the $j^{th}$ marker.

The resulting twelve equations are solved for $T_x$, $T_y$, $T_z$ and orientation angles A, E, T for the ball's first location, A. A similar set of twelve equations are solved for the second location position of the ball, B. The twelve (12) equations are nonlinear and are solved iteratively by using a linearization of Taylor's theorem. Generally, the equations converge to a solution for the six unknown parameters in eight iterations.

The velocity components of the ball along the three axes of the coordinate system are then computed from the formulas:

$$V_x = \frac{T_x(t + \Delta T) - T_x(t)}{\Delta T}$$

$$V_y = \frac{T_y(t + \Delta T) - T_y(t)}{\Delta T}$$

$$V_z = \frac{T_z(t + \Delta T) - T_z(t)}{\Delta T}$$

in which $\Delta T$ is the time interval between strobe firings.

The spin components result from multiplying the orientational matrix $M^T(A,E,T,t)$ and $M(A',E',T',t+\Delta T)$ and equating the off-diagonal elements of the resulting relative orientation matrix.

$$A(t,t+\Delta T) = M(t+\Delta T)M^T(t)$$

Then the magnitude $\theta$ of the angle of rotation vector of the two balls during the time increment $\Delta T$ is given by:

$$\theta = \sin^{-1}(R/2)$$

where $$R = \sqrt{L^2 + M^2 + N^2}$$

$L = A_{32} - A_{23}$ $M = A_{13} - A_{31}$ $N = A_{21} - A_{12}$

The three orthogonal components of spin rate, $W_x$, $W_y$, $W_z$ are given by:

$$W_x = \sin^{-1}(R/2)L/(R\Delta T) = \theta L/(R\Delta T)$$

$$W_y = \sin^{-1}(R/2)M/(R\Delta T) = \theta M/(R\Delta T)$$

$$W_z = \sin^{-1}(R/2)N/(R\Delta T) = \theta N/(R\Delta T)$$

Statistical measurements made on twelve Tour™ golf balls indicate a variation between the center marker and the five outlying markers of 36.49°±0.37°. Table V below shows the results from computer simulation on the error deviation for the above center spacing variation.

TABLE V

|  | Simulation Of Model | Model |
|---|---|---|
| Ball velocity (ft/sec) | 199.98 ± 0.93 | 200 |
| Launch angle (degrees) | 10.02 ± 0.04 | 10 |
| Side angle (degrees) | 0.04 ± 0.23 | 0 |
| $W_x$ (spin rate) (rpm) | 9 ± 15 | 0 |
| $W_y$ (spin rate) (rpm) | −7 ± 26 | 0 |
| $W_x$ (spin rate) (rpm) | −2999 ± 2 | −3000 |

Referring again to FIG. 6, an alternative method of utilizing the camera system of this embodiment is depicted. An adjustable mechanical golf ball driving unit 50 is used with a golf club 52 for striking a golf ball 54 with precisely predetermined illuminable markers. The monitoring system 3" of FIG. 7 is used for determining the launch conditions. Mechanical driving unit 50 is adjusted to give the launch angle, spin velocity and initial velocity desired for the particular operation.

Three golf balls 8" marked with circular retroreflective material at five (5) positions of 37° from a center marking as shown in FIG. 8 were used. The three balls were hit twice and generated the data shown in Table VI. The three components of velocity were transformed to velocity magnitude and two angles defined as follows:

$$\text{Ball Velocity} = \sqrt{V_x^2 + V_y^2 + V_z^2}$$

$$\text{Launch} = \tan^{-1}\left( \frac{V_y}{\sqrt{V_z^2 + V_x^2}} \right)$$

$$\text{Side Angle} = \tan^{-1}\left( \frac{V_z}{V_x} \right)$$

As shown in Table VI, the variation in side angle is the most pronounced, percentage wise, relative to the other measured parameters.

TABLE VI

| SHOT #1 | BALL VELOCITY (FEET/SEC) | LAUNCH ANGLE (DEGREES) | SIDE ANGLE (DECREES) | $W_x$ (rpm) | $W_y$ (rpm) | $W_z$ (rpm) |
|---|---|---|---|---|---|---|
| 1 | 191.7 | 16.3 | 0.4 | −6513.2 | 583.1 | −198.3 |
| 2 | 192.5 | 16.0 | −1.6 | −6654.3 | 553.7 | 50.0 |
| 3 | 192.1 | 15.4 | −1.3 | −6591.1 | 531.6 | 48.4 |
| 4 | 191.5 | 15.9 | −0.3 | −6526.5 | 531.9 | −78.7 |
| 5 | 191.1 | 16.1 | −2.2 | −6665.6 | 532.3 | −311.1 |
| 6 | 193.2 | 15.9 | −1.2 | −6482.1 | 551.3 | −232.0 |
| Average | 192.0 | 15.9 | −1.2 | −6570.7 | 547.3 | −120.3 |
| STD | 0.8 | 0.3 | 1.09 | 74.9 | 20.2 | 151.1 |

In Table VII, the clubface was rotated to hit sliced shots and the six shots were repeated.

TABLE VII

| SHOT #1 | BALL VELOCITY (FEET/SEC) | LAUNCH ANGLE (DEGREES) | SIDE ANGLE (DECREES) | $W_x$ (rpm) | $W_y$ (rpm) | $W_z$ (rpm) |
|---|---|---|---|---|---|---|
| 1 | 186.4 | 18.5 | −9.1 | −7564.5 | −707.5 | −751.9 |
| 2 | 185.7 | 18.5 | −9.2 | −7804.6 | −668.9 | −862.9 |

TABLE VII-continued

| SHOT #1 | BALL VELOCITY (FEET/SEC) | LAUNCH ANGLE (DEGREES) | SIDE ANGLE (DECREES) | $W_x$ (rpm) | $W_y$ (rpm) | $W_z$ (rpm) |
|---|---|---|---|---|---|---|
| 3 | 186.3 | 18.6 | −10.3 | −7675.2 | −629.2 | −946.9 |
| 4 | 185.0 | 19.0 | −8.6 | −7633.3 | −806.6 | −711.5 |
| 5 | 184.8 | 18.9 | −8.6 | −7769.0 | −711.4 | −876.8 |
| 6 | 185.8 | 19.6 | −10.3 | −7513.5 | −708.3 | −859.1 |
| Average | 185.7 | 18.9 | −9.4 | −7661.7 | −705.3 | −834.8 |
| STD | 0.6 | 0.4 | 0.8 | 115.4 | 59.1 | 86.9 |

Finally, in Table VIII, the clubface was positioned to hit hook shots and again similar results for variation in the six parameters were obtained.

TABLE VIII

| SHOT #1 | BALL VELOCITY (FEET/SEC) | LAUNCH ANGLE (DEGREES) | SIDE ANGLE (DECREES) | $W_x$ (rpm) | $W_y$ (rpm) | $W_z$ (rpm) |
|---|---|---|---|---|---|---|
| 1 | 190.6 | 17.0 | −5.9 | 5516.0 | 1224.2 | −694.0 |
| 2 | 191.8 | 16.3 | −6.5 | 6096.1 | 1053.0 | −755.6 |
| 3 | 190.6 | 16.8 | −8.1 | −5858.9 | 1424.9 | −839.9 |
| 4 | 190.7 | 16.9 | −4.7 | −5835.0 | 1096.0 | −653.8 |
| 5 | 190.5 | 16.5 | −6.1 | −6195.3 | 1181.3 | −791.2 |
| 6 | 191.1 | 16.6 | −6.0 | −6070.3 | 11236.5 | −683.4 |
| Average | 190.9 | 16.7 | −6.2 | −5928.6 | 1202.6 | −736.3 |
| STD | 0.8 | 0.3 | 1.1 | 246.2 | 130.5 | 71.4 |

In summary, a one camera system can adequately calculate the speed and spin of a golf ball and be used as a useful practice aid and data-gathering apparatus for equipment design.

It is understood that various other modifications will also be readily apparent to those skilled in the art without departing from the scope and spirit of the invention. For example, other objects such as golf clubheads, baseballs, footballs, soccer balls, hockey pucks, etc. may also be monitored using the system described.

We claim:

1. A system for monitoring the initial portion of the flight of an object through a field of view comprising:

(a) a support means for the object;

(b) a portable housing including at least two cameras in fixed relationship in such housing;

(c) a first camera unit in such housing having a light sensitive panel, said first camera unit being focused on the field of view through which the object passes during the initial portion of its flight;

(d) a second camera unit in such housing having a light sensitive panel focused on the field of view;

(e) means for shuttering or gating the camera units at least twice as the object passes through the field of view;

(f) three or more contrasting areas on the object positioned so that light emitting from such areas reaches such light sensitive panels to form light patterns thereon and create an analog image signal when the camera shutters are open; and (g) computer means in or near such portable housing for receiving and processing such analog signals to determine the path of the object, its speed and spin during such initial portion of flight.

2. The system of claim 1 wherein said three or more contrasting areas includes six dots, one dot at a center location and the other five dots are at a longitude of 30° and at latitudes of 0°, 72°, 144°, 216° and 288°, respectively.

3. The system of claim 1 further including an acoustical sensor for sensing the striking of the object, said means for admitting light responsive to said acoustical sensor.

4. The system of claim 1 wherein said shuttering means includes a flash means for emitting two flashes of light onto the object.

5. The system of claim 1 wherein said shuttering means includes means for controlling the time periods during which said light sensitive panels receive light from said object.

6. The system of claim 1 wherein said shuttering means includes a ferroelectric liquid crystal shutter.

7. The system of claim 1 further including a calibration fixture having a plurality of contrasting areas each having a precisely predetermined location thereon.

8. The system of claim 1 wherein said first and second camera units include a CCD camera having a resolution of 510×240 pixels.

9. The system of claim 1 wherein said three or more contrasting areas are round areas of reflective materials adhered to the surface of the object.

10. The system of claim 1 wherein said three or more contrasting areas include corner-reflective retroflectors.

11. The system of claim 1 wherein said three or more contrasting areas include painted spots of reflective material.

12. An apparatus for measuring in a field the flight characteristics of a sports object passing through a field having a plurality of illuminable areas thereon comprising:

(a) first and second spaced-apart electro-video units in a portable housing, each unit having a shutter focused on the object in the field;

(b) measuring means in the electro-video units which recognize the position of calibrated illuminable areas in the field;

(c) at least three light reflecting dot means on the object;

(d) a plurality of flash lights for lighting the field;

(e) control means for opening and closing each shutter and energizing each light such that a light illuminates the object in the field when the object is at a first position and when it is at a second position;

(f) light receiving means in the electro-video unit for receiving light from the dot means when the object is at the first position and at the second position; and (g) computer means in or near the housing for comparing the calibrated dot positions at first position with the dot positions at the second position.

13. The system of claim 12 wherein said at least three light reflecting dot means includes six dots.

14. The system of claim 13 wherein one dot is at a center location and the other five dots are at a longitude of 30° and at latitudes of 0°, 72°, 144°, 216° and 288°, respectively.

15. The system of claim 12 further including an acoustical sensor for sensing the striking of the object, said control means for opening and closing responsive to said acoustical sensor.

16. The system of claim 12 wherein said control means for opening and closing includes means for controlling the time periods during which said light receiving means receives light from said object.

17. The system of claim 12 wherein said control means for opening and closing includes a ferroelectric liquid crystal shutter.

18. The system of claim 12 further including a calibration fixture having a plurality of contrasting areas each having a precisely predetermined location thereon.

19. The system of claim 12 wherein light receiving means includes a CCD camera having a resolution of 754×244 pixels.

20. The system of claim 12 wherein said at least three light reflecting dots means include corner-reflective retroflectors.

21. The system of claim 12 wherein said at least three light reflecting dot means include painted spots of reflective material.

22. The system of claim 12 in which all means except the computer means and support means are located in the portable housing.

23. A system for monitoring the initial portion of the flight of an object through a field of view comprising:

(a) a support means for the object;

(b) a portable housing including a camera unit in fixed relationship in such housing;

(c) said camera unit in such housing having a light sensitive panel focused on the field of view through which the object passes during the initial portion of its flight;

(d) means for shuttering or gating said camera unit at least twice as the object passes through the field of view;

(e) three or more contrasting areas on the object positioned so that light emitting from such areas reaches each the light sensitive panel to form light patterns thereon and create an analog image signal when the camera shutter is open; and (f) computer means in or near such portable housing for receiving and processing such analog signals to determine the path of the object, its speed and spin during such initial portion of flight.

24. The system of claim 23 wherein said three or more contrasting areas includes six dots, one dot at a center location and the other five dots are at a longitude of 37° and at latitudes of 0°, 72°, 144°, 216° and 288°, respectively.

25. The system of claim 23 further including an acoustical sensor for sensing the striking of the object.

26. The system of claim 23 wherein said shuttering means includes a flash means for emitting two flashes of light onto the object.

27. The system of claim 23 wherein said shuttering means includes means for controlling the time periods during which said light sensitive panel receive light from said object.

28. The system of claim 23 wherein said shuttering means includes a ferroelectric liquid crystal shutter.

29. The system of claim 23 further including a calibration fixture having a plurality of contrasting areas each having a precisely predetermined location thereon.

30. The system of claim 23 wherein said camera unit include a CCD camera having a resolution of 754×244 pixels.

31. The system of claim 23 wherein said three or more contrasting areas are round areas of reflective materials adhered to the surface of the object.

32. The system of claim 23 wherein said three or more contrasting areas include corner-reflective retroflectors.

33. The system of claim 23 wherein said three or more contrasting areas include painted spots of reflective material.

34. An apparatus for measuring in a field the flight characteristics of a sports object passing through a field having a plurality of illuminable areas thereon comprising:

(a) at least one electro-video unit in a portable housing, each unit having a shutter focused on the object in the field;

(b) calibrating means for calibrating illuminable areas on the object;

(c) measuring means in each electro-video units which recognize the position of the calibrated illuminable areas in the field;

(d) a plurality of flashing lights for lighting the field;

(e) control means for opening and closing each shutter and energizing each flash light such that light illuminates the object in the field when the object is at a first position and when it is at a second position;

(f) light receiving means in each electro-video unit for receiving light from the dot means when the object is at the first position and at the second position; and (g) computer means in or near the housing for comparing the calibrated illuminable areas at first position with such areas at the second position.

35. The system of claim 34 wherein the illuminable areas are six dots, one dot at a center location and the other five dots are at a longitude of 37° and at latitudes of 0°, 72°, 144°, 216° and 288°, respectively.

36. The system of claim 34 further including an acoustical sensor for sensing the striking of the object.

37. The system of claim 34 further including a calibration fixture having a plurality of contrasting areas each having a precisely predetermined location thereon.

38. The system of claim 34 wherein said light receiving means includes a CCD camera having a resolution of 754×244 pixels.

39. The system of claim 34 wherein said illuminable areas are round areas of reflective material adhered to the surface of the object.

40. The system of claim 34 in which all means except the computer means and support means are located in the portable housing.

41. A system for monitoring the initial portion of the flight of an object through a field of view comprising:

(a) a camera having a light sensitive panel focused on the field of view through which the object passes during the initial portion of its flight;

(b) means for lighting said object at least twice as the object passes through the field of view;

(c) three or more illuminable markers on the object positioned so that light reflected from such markers reaches said light sensitive panel to form an image thereon, each of said illuminable marker having a precisely predetermined location on the object; and (d) computer means for processing said image on said light sensitive panel to determine the launch conditions of the object during the initial portion of flight.

42. The system of claim 41 wherein said three or more illuminable markers includes six dots, one dot at a center location and the other five dots are at a longitude of 37° and at latitudes of 0°, 72°, 144°, 216° and 288°, respectively.

43. The system of claim 41 further including an acoustical sensor for sensing the striking of the object.

44. The system of claim 41 wherein said camera is a CCD camera having a resolution of 754×244 pixels.

45. The system of claim 41 wherein said illuminable markers are round areas of reflective material adhered to the surface of the object.

46. The system of claim 41 further including a display means for displaying the projected flight of the object.

* * * * *

UNITED STATES PATENT AND TRADEMARK OFFICE
CERTIFICATE OF CORRECTION

PATENT NO. : 5,471,383            Page 1 of 4
DATED        : November 28, 1995
INVENTOR(S) : W. Gobush et al.

It is certified that error appears in the above-indentified patent and that said Letters Patent is hereby corrected as shown below:

In column 15, Table V should read as follows:

TABLE V

|  | Simulation Of Model | Model |
|---|---|---|
| Ball velocity (ft/sec) | 199.98 ± 0.93 | 200 |
| Launch angle (degrees) | 10.02 ± 0.04 | 10 |
| Side angle (degrees) | 0.04 ± 0.23 | 0 |
| $W_x$ (spin rate) (rpm) | 9 ± 15 | 0 |
| $W_y$ (spin rate) (rpm) | -7 ± 26 | 0 |
| $W_z$ (spin rate) (rpm) | -2999 ± 2 | -3000 |

UNITED STATES PATENT AND TRADEMARK OFFICE
CERTIFICATE OF CORRECTION

PATENT NO. : 5,471,383  
DATED : November 28, 1995  
INVENTOR(S) : W. Gobush et al.

It is certified that error appears in the above-indentified patent and that said Letters Patent is hereby corrected as shown below:

In columns 15 and 16, Table VI should read as follows:

TABLE VI

| SHOT #1 | BALL VELOCITY (FEET/SEC) | LAUNCH ANGLE (DEGREES) | SIDE ANGLE (DECREES) | $W_z$ (rpm) | $W_y$ (rpm) | $W_x$ (rpm) |
|---|---|---|---|---|---|---|
| 1 | 191.7 | 16.3 | 0.4 | -6513.2 | 583.1 | -198.3 |
| 2 | 192.5 | 16.0 | -1.6 | -6654.3 | 553.7 | 50.0 |
| 3 | 192.1 | 15.4 | -1.3 | -6591.1 | 531.6 | 48.4 |
| 4 | 191.5 | 15.9 | -0.3 | -6526.5 | 531.9 | -78.7 |
| 5 | 191.1 | 16.1 | -2.2 | -6665.6 | 532.3 | -311.1 |
| 6 | 193.2 | 15.9 | -1.2 | -6482.1 | 551.3 | -232.0 |
| Average | 192.0 | 15.9 | -1.2 | -6570.7 | 547.3 | -120.3 |
| STD | 0.8 | 0.3 | 1.09 | 74.9 | 20.2 | 151.1 |

UNITED STATES PATENT AND TRADEMARK OFFICE
CERTIFICATE OF CORRECTION

PATENT NO. : 5,471,383  
DATED : November 28, 1995  
INVENTOR(S) : W. Gobush et al.

It is certified that error appears in the above-indentified patent and that said Letters Patent is hereby corrected as shown below:

In columns 15 and 16, Table VII should read as follows:

TABLE VII

| SHOT #1 | BALL VELOCITY (FEET/SEC) | LAUNCH ANGLE (DEGREES) | SIDE ANGLE (DECREES) | $W_z$ (rpm) | $W_y$ (rpm) | $W_x$ (rpm) |
|---|---|---|---|---|---|---|
| 1 | 186.4 | 18.5 | -9.1 | -7564.5 | -707.5 | -751.9 |
| 2 | 185.7 | 18.5 | -9.2 | -7804.6 | -668.9 | -862.9 |

In columns 17 and 18, Table VII should read as follows:

TABLE VII - continued

| SHOT #1 | BALL VELOCITY (FEET/SEC) | LAUNCH ANGLE (DEGREES) | SIDE ANGLE (DECREES) | $W_z$ (rpm) | $W_y$ (rpm) | $W_x$ (rpm) |
|---|---|---|---|---|---|---|
| 3 | 186.3 | 18.6 | -10.3 | -7675.2 | -629.2 | -946.9 |
| 4 | 185.0 | 19.0 | -8.6 | -7633.3 | -806.6 | -711.5 |
| 5 | 184.8 | 18.9 | -8.6 | -7769.0 | -711.4 | -876.8 |
| 6 | 185.8 | 19.6 | -10.3 | -7513.5 | -708.3 | -859.1 |
| Average | 185.7 | 18.9 | -9.4 | -7661.7 | -705.3 | -834.8 |
| STD | 0.6 | 0.4 | 0.8 | 115.4 | 59.1 | 86.9 |

UNITED STATES PATENT AND TRADEMARK OFFICE
CERTIFICATE OF CORRECTION

PATENT NO. : 5,471,383

DATED : November 28, 1995

INVENTOR(S) : W. Gobush et al.

It is certified that error appears in the above-indentified patent and that said Letters Patent is hereby corrected as shown below:

In columns 17 and 18, Table VIII should read as follows:

TABLE VIII

| SHOT #1 | BALL VELOCITY (FEET/SEC) | LAUNCH ANGLE (DEGREES) | SIDE ANGLE (DECREES) | $W_z$ (rpm) | $W_y$ (rpm) | $W_x$ (rpm) |
|---|---|---|---|---|---|---|
| 1 | 190.6 | 17.0 | -5.9 | -5516.0 | 1224.2 | -694.0 |
| 2 | 191.8 | 16.3 | -6.5 | -6096.1 | 1053.0 | -755.6 |
| 3 | 190.6 | 16.8 | -8.1 | -5858.9 | 1424.9 | -839.9 |
| 4 | 190.7 | 16.9 | -4.7 | -5835.0 | 1096.0 | -653.8 |
| 5 | 190.5 | 16.5 | -6.1 | -6195.3 | 1181.3 | -791.2 |
| 6 | 191.1 | 16.6 | -6.0 | -6070.3 | 1236.5 | -683.4 |
| Average | 190.9 | 16.7 | -6.2 | -5928.6 | 1202.6 | -736.3 |
| STD | 0.8 | 0.3 | 1.1 | 246.2 | 130.5 | 71.4 |

Signed and Sealed this

Ninth Day of July, 1996

Attest:

BRUCE LEHMAN

Attesting Officer

Commissioner of Patents and Trademarks